United States Patent
Wendeln et al.

(10) Patent No.: US 11,746,059 B2
(45) Date of Patent: Sep. 5, 2023

(54) INDUCTION MELT INFILTRATION PROCESSING OF CERAMIC MATRIX COMPOSITE COMPONENTS

(71) Applicant: General Electric Company, Schenectady, NY (US)

(72) Inventors: Nicholas Frederick Wendeln, Lebanon, OH (US); Paul Edward Gray, North East, MD (US); Timothy P. Coons, Cincinnati, OH (US); Joseph John Nick, Arden, NC (US)

(73) Assignee: General Electric Companhy, Schenectady, NY (US)

( * ) Notice: Subject to any disclaimer, the term of this patent is extended or adjusted under 35 U.S.C. 154(b) by 593 days.

(21) Appl. No.: 16/801,591

(22) Filed: Feb. 26, 2020

(65) Prior Publication Data

US 2021/0261470 A1   Aug. 26, 2021

(51) Int. Cl.
*C04B 35/80* (2006.01)
*C04B 35/657* (2006.01)
*F27B 14/06* (2006.01)

(52) U.S. Cl.
CPC ............ *C04B 35/80* (2013.01); *C04B 35/657* (2013.01); *F27B 14/061* (2013.01); *C04B 2235/428* (2013.01); *C04B 2235/5252* (2013.01); *C04B 2235/616* (2013.01); *C04B 2235/6562* (2013.01)

(58) Field of Classification Search
CPC ............ C04B 35/657; C04B 2235/616; C04B 2235/6562
See application file for complete search history.

(56) References Cited

U.S. PATENT DOCUMENTS

| | | | |
|---|---|---|---|
| 4,695,316 | A | 9/1987 | Cartlidge |
| 5,416,794 | A | 5/1995 | Cignetti et al. |
| 5,483,043 | A | 1/1996 | Sturman, Jr. et al. |
| 5,666,377 | A | 9/1997 | Havas et al. |
| 5,922,234 | A | 7/1999 | Grow et al. |
| 6,319,348 | B1 * | 11/2001 | Olry ............ D04H 1/4242 156/181 |
| 6,741,632 | B1 | 5/2004 | Dunn et al. |
| 7,419,373 | B2 | 9/2008 | Gerhard et al. |
| 9,366,140 | B2 | 6/2016 | Chamberlain |
| 9,591,696 | B2 | 3/2017 | Uchida et al. |
| 10,151,362 | B1 | 12/2018 | Bianco et al. |

(Continued)

*Primary Examiner* — Robert A Vetere
(74) *Attorney, Agent, or Firm* — Dority & Manning, P.A.

(57) ABSTRACT

A system and method of melt infiltrating components is provided. In one example aspect, an inductive heating system includes a heating source that inductively heats a susceptor. The susceptor defines a working chamber in which components can be received. During melt infiltration, the system can heat the susceptor and thus the components and melt infiltrants disposed within the working chamber at a first heating rate. The first heating rate can be faster than 50° C./minute. The system can then heat the components and melt infiltrants at a second heating rate. The first heating rate is faster than the second heating rate. Thereafter, the system can heat the components and infiltrants at a third heating rate. The third heating rate can be a constant rate at or above the melting point of the melt infiltrants. The infiltrants can melt and thus infiltrate into the component to densify the component.

20 Claims, 5 Drawing Sheets

(56) References Cited

U.S. PATENT DOCUMENTS

| | | | |
|---|---|---|---|
| 2010/0022479 A1* | 1/2010 | Bourban | A61L 27/56 514/772.3 |
| 2011/0165325 A1* | 7/2011 | Paulman | H01L 31/1836 118/724 |
| 2014/0169862 A1* | 6/2014 | Gonzalez | C04B 37/005 156/326 |
| 2018/0335099 A1 | 11/2018 | Bianco et al. | |

* cited by examiner

INDUCTION MELT INFILTRATION PROCESSING OF CERAMIC MATRIX COMPOSITE COMPONENTS

FIELD

The present subject matter relates generally to processing composite components, such as ceramic matrix composite (CMC) components. More particularly, the present subject matter relates to systems and methods for induction melt infiltration processing of CMC components.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. During operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Typically, components inside the combustion and turbine sections are complex to manufacture due to their geometries. Moreover, the working environment for such components is extremely severe due to the high temperature and pressures. Accordingly, components within the flow path of the combustion gases have strict requirements for their geometrical profiles and temperature tolerance to maintain desired efficiency of the engine. As ceramic matrix composite (CMC) materials can better withstand such severe environments than traditional metallic materials, there is particular interest in replacing components formed of traditional metallic materials inside gas turbine engine with CMC materials.

CMC components typically undergo thermal processing during manufacture. For instance, CMC components may undergo a densification process, such as a melt infiltration process. Current state melt infiltration methods utilize conventional resistive heating methods. Electrical resistance heating and other conventional heating techniques have limited heating capability needed for rapid production. Furthermore, vital components of the heating systems, such as insulation and heating elements, are subject to chemical attacks, leading to rapid degradation thereof.

Accordingly, systems and methods that address one or more of the challenges noted above would be useful.

BRIEF DESCRIPTION

Aspects and advantages of the invention will be set forth in part in the following description, or may be obvious from the description, or may be learned through practice of the invention.

In one aspect, a method of melt infiltrating a component utilizing an induction heating system is provided. The method includes heating, via the induction heating system, the component and a melt infiltrant at a first heating rate within a working chamber of the induction heating system, wherein the first heating rate is faster than 50° C./minute. The method also includes heating, via the induction heating system, the component and the melt infiltrant at a second heating rate within the working chamber, wherein the first heating rate is faster than the second heating rate.

In another aspect, an induction heating system is provided. The induction heating system includes a susceptor defining a working chamber for receiving a component and a melt infiltrant. The induction heating system also includes a heating source for inductively imparting thermal energy to the susceptor. Further, the induction heating system includes a control system. The control system includes one or more sensors and one or more controllers communicatively coupled with the one or more sensors and the heating source. The one or more controllers are configured to cause the heating source to heat the susceptor such that the component and the melt infiltrant disposed within the working chamber are heated at a first heating rate, wherein the first heating rate is faster than 50° C./minute, and to cause the heating source to heat the susceptor such that the component and the melt infiltrant disposed within the working chamber are heated at a second heating rate, wherein the first heating rate is faster than the second heating rate.

In another aspect, a method of melt infiltrating a component utilizing an induction heating system is provided. The component can be a CMC preform, for example. The method includes heating, via the induction heating system, the component and a melt infiltrant at a first heating rate within a working chamber of the induction heating system until a temperature within the working chamber reaches a first temperature threshold, wherein the first heating rate is faster than 50° C./minute. The method also includes heating, via the induction heating system, the component and the melt infiltrant at a second heating rate within the working chamber until the temperature within the working chamber reaches a second temperature threshold, wherein the first heating rate is at least five times faster than the second heating rate and the second temperature threshold is greater than the first temperature threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
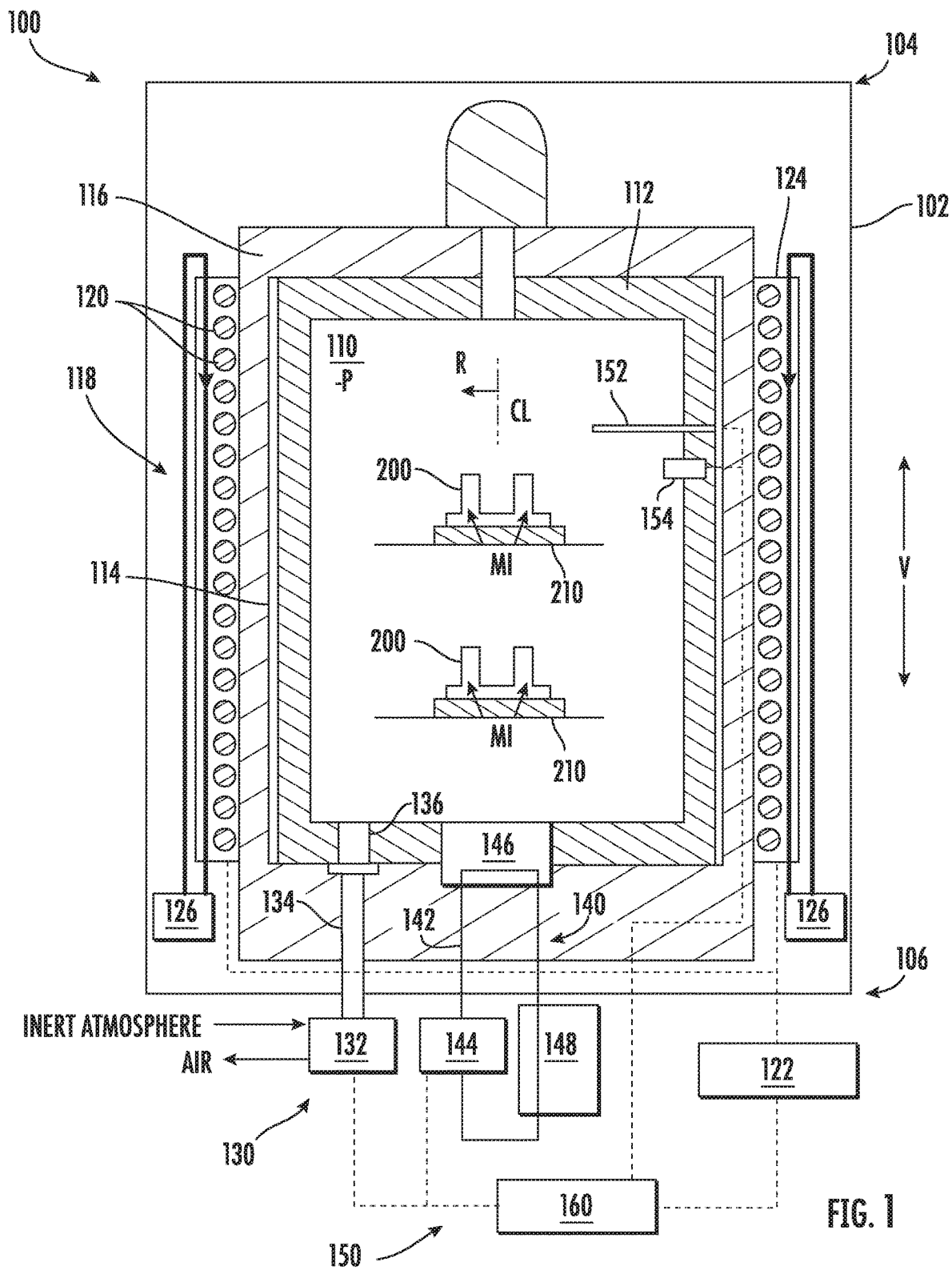
FIG. 1 provides a schematic view of an induction heating system according to an example embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. Furthermore, as used herein, terms of approximation, such as "approximately," "substantially," or "about," refer to being within a fifteen percent (15%) margin of the stated value.

Generally, the present disclosure is directed to systems and methods for melt infiltrating components, such as ceramic fiber-containing preforms. In one aspect, an inductive heating system is provided for melt infiltrating components. The system includes an inductive heating source that inductively heats a susceptor. The susceptor defines a working chamber in which one or more components can be received. During melt infiltration, the induction heating system can heat the susceptor and thus the components and melt infiltrants (e.g., silicon blocks or pucks) disposed within the working chamber at a first heating rate. The first heating rate can correspond to a rate faster than 50° C./minute, for example. The induction heating system can then heat the susceptor and thus the components and melt infiltrants disposed within the working chamber at a second heating rate. The first heating rate is faster than the second heating rate. For example, the second heating rate can correspond to a rate faster than 20° C./hour. Thereafter, the induction heating system can heat the components and melt infiltrants disposed within the working chamber at a third heating rate. The third heating rate can be a constant rate at or above the melting point of the melt infiltrants. The melt infiltrants can melt and can thus infiltrate into the component to densify the component. After infiltration, the induction heating system can also cool the component. An example method is also provided.

FIG. 1 provides a schematic view of an induction heating system 100 according to an example embodiment of the present disclosure. Generally, the induction heating system 100 is operatively configured to thermally process one or more components, such as Ceramic Matrix Composite (CMC) components for aviation gas turbine engines. More particularly, the induction heating system 100 is configured to facilitate infiltration of a melt infiltrant into a component, e.g., to densify the component. The component can be a ceramic preform, for example. The melt infiltrant can be a block or puck of silicon, for example. As will be explained in detail herein, the induction heating system 100 can rapidly inductively heat components in such a manner that cycle times for melt infiltrating such components can be significantly reduced over conventional resistively-heated melt infiltration processes. Moreover, the induction heating system 100 can include a cooling system for cooling the inductively-heated components to further reduce cycle times.

As shown in FIG. 1, the induction heating system 100 includes a frame or housing 102. The housing 102 extends between a top 104 and a bottom 106 along a vertical direction V defined by the induction heating system 100. Moreover, the induction heating system 100 defines a working chamber 110, and more particularly, a susceptor 112 of the induction heating system 100 defines the working chamber 110. The working chamber 110 is sized to receive one or more components. For instance, as depicted in FIG. 1, two turbine shroud preforms are shown positioned within the working chamber 110. In some embodiments, the working chamber 110 is between one tenth of a cubic foot and ten cubic feet ($\frac{1}{10}$ ft$^3$-10 ft$^3$). The working chamber 110 can be defined by the susceptor 112 having any suitable shape. For this embodiment, for example, the working chamber 110 has a generally cylindrical shape. However, as noted, the working chamber 110 can have other suitable shapes as well. The one or more components 200 can be positioned on shelving within the working chamber 110, or alternatively, the one or more components 200 can be placed on a rack and the rack along with the components 200 can be placed into the working chamber 110, e.g., manually or by a mover device.

The susceptor 112 can be formed of a suitable electrically conducting material. For instance, for this embodiment, the susceptor 112 is formed of a graphite material. Notably, the graphite susceptor 112 is coated with a silicon carbide (SiC) coating. The silicon carbide coating can be applied along the inner and/or outer surfaces of the susceptor 112 that define the working chamber 110. In some embodiments, however, the silicon carbide coating can be applied to other surfaces of the susceptor 112. The silicon carbide coating prevents degradation of the susceptor 112 and thus improves the useful life of the susceptor 112. In addition, an insulating layer 114 can be applied to one or more outer surfaces of the susceptor 112. For instance, the insulating layer 114 can be a carbon felt layer attached to an outer surface of the susceptor 112, e.g., as shown in FIG. 1. Moreover, the susceptor 112 can include an access member (e.g., a door or lid) that provides selective access to the working chamber 110, e.g., for loading and unloading components 200 into or from the working chamber 110. The access member can be sealed when closed such that the working chamber 110 is or is substantially a sealed volume, e.g., during a melt infiltration process.

Figure 2:
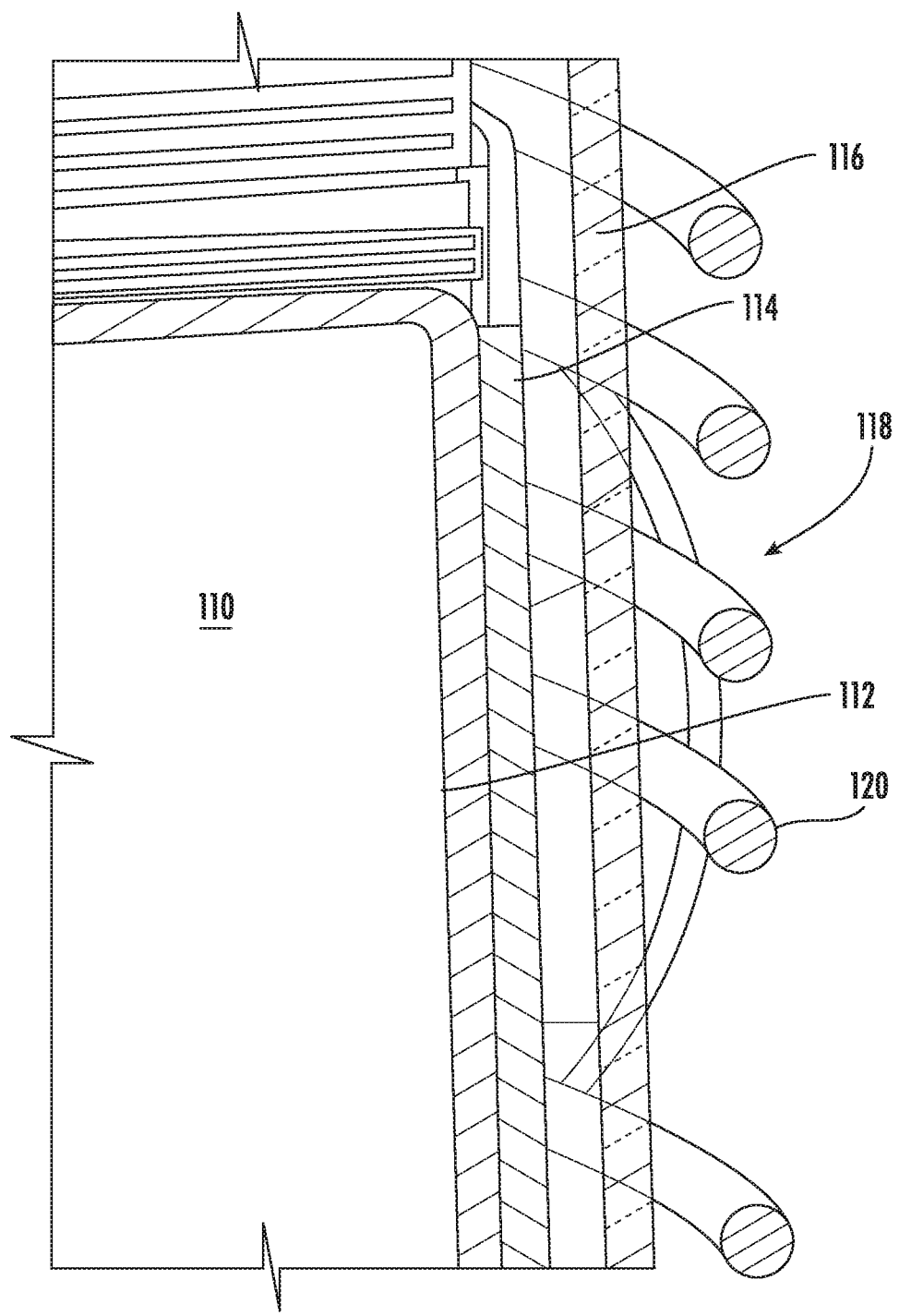
FIG. 2 provides a close up cross-sectional view of a portion of the induction heating system of FIG. 1.

The induction heating system 100 also includes an electrical insulator 116 disposed around the susceptor 112 as well as a heating source 118 disposed around the electrical insulator 116 as depicted in FIG. 1. The electrical insulator 116 is positioned between the susceptor 112 and the heating source 118, e.g., along a radial direction R extending outward from a centerline CL defined by the susceptor 112. The centerline CL extends parallel to the vertical direction V. The electrical insulator 116 can be formed of any suitable insulating dielectric material, such as a quartz liner. Moreover, for this embodiment, the heating source 118 includes one or more electrical coils 120. The one or more electrical coils 120 are in electrical communication with a power supply 122. During a heating mode, the power supply 122 can provide electrical power to the electrical coils 120. For instance, the power supply 122 can provide high frequency alternating current (AC) to the one or more electrical coils 120. The high frequency AC passed through the electrical coils 120 generates eddy currents in the susceptor 112, causing the susceptor 112 to heat or increase in temperature. The heated susceptor 112 in turn imparts thermal energy or heat to the one or more components 200 and melt infiltrant 210 positioned within the working chamber 110. FIG. 2 provides a close up cross-sectional view of a portion of the susceptor 112, the insulating layer 114, the electrical insulator 116, and the heating source 118, which as noted above, include one or more electrical coils 120 in this example embodiment.

In some embodiments, as shown in FIG. 1, the electrical coils 120 can be cooled via a cooling fluid. For instance, the cooling fluid can be water or air. For this embodiment, the one or more electrical coils 120 are housed within one or more coil housings 124. As shown in FIG. 1, a cooling fluid can be moved through the coil housings 124 to remove heat from the electrical coils 120, e.g., during a cooling mode. One or more cold sinks 126 can be provided for cooling the heated cooling fluid. One or more pumps can move the cooling fluid through the coil housings 124 such that electrical coils 120 can exchange heat with the cooling fluid.

In addition, the induction heating system 100 includes a vacuum system 130. The vacuum system 130 includes various components for creating a vacuum within the working chamber 110. That is, the vacuum system 130 of the induction heating system 100 creates a negative pressure or vacuum within the working chamber 110 by moving air from the working chamber 110 to an external volume, such as an ambient environment. As illustrated in FIG. 1, the vacuum system 130 includes a vacuum or first pump 132 operable to move air to or from the working chamber 110. A conduit 134 fluidly connects the first pump 132 with the working chamber 110. The conduit 134 is fluidly connected with a port 136 of the susceptor 112 at one end and the first pump 132 at its opposing end. In vacuum mode, the first pump 132 can move air from within the working chamber 110 and exhaust the air to an external volume, as noted above. The negative pressure or vacuum created within the working chamber 110 is represented by the "-P" in FIG. 1. The components 200 and melt infiltrants 210 within the working chamber 110 can be placed under vacuum during melt infiltration.

Further, in some embodiments, when functioning in a cooling mode, e.g., to cool components 200 disposed within the working chamber 110, the vacuum system 130 can move an inert atmosphere into the working chamber 110. For instance, the inert atmosphere can include at least one of argon, nitrogen, helium, some combination thereof, etc. Particularly, the first pump 132 can move an inert atmosphere from an inert atmosphere source (e.g., a tank) into the working chamber 110 via conduit 134. The introduced inert atmosphere can cool the working chamber 110 and the components 200 after infiltration, for example.

In some embodiments, the induction heating system 100 includes a cooling system 140. For the depicted embodiment of FIG. 1, the cooling system 140 includes a cooling loop 142. A pump 144 is positioned along the cooling loop 142 and is operable to move a working fluid (e.g., an inert fluid including at least one of argon, nitrogen, helium) through the cooling loop 142. A first heat exchanger 146 is positioned along the cooling loop 142 in a heat exchange relationship with the fluid within the working chamber 110. The first heat exchanger 146 is operable to remove or extract heat from the working chamber 110, e.g., during a cooling mode of the induction heating system 100. A second heat exchanger 148 is positioned along the cooling loop 142 and downstream of the first heat exchanger 146. The second heat exchanger 148 is operable to expel heat from the working fluid flowing through the cooling loop 142. A fan or other active cooling device can move air or another working fluid across the second heat exchanger 148 for more efficient heat exchange. Other components can be positioned along the cooling loop 142, such as an expansion device, other heat exchangers in parallel or series with the first and/or second heat exchangers, etc.

As further shown in FIG. 1, the induction heating system 100 includes a control system 150. The control system 150 is configured to control various aspects of the induction heating system 100, including controlling the heating and cooling rates within the working chamber 110 and thus the heating and cooling of the components therein during a melt infiltration process. The control system 150 can include one or more control devices, such as sensors, controllers, processors, etc. that can monitor and control various aspects of the induction heating system 100. An example manner in which the control system 150 can control the induction heating system 100 will be described in further detail herein.

The control system 150 can monitor one or more operating parameters within the working chamber 110 using one or more sensors. For instance, the control system 150 can monitor the temperature within the working chamber 110 using temperature sensor 152. The control system 150 can monitor the pressure within the working chamber 110 using sensor 154. The control system 150 can include other sensors operable to measure other operating parameters as well. For instance, the control system 150 can include a sensor operable to monitor one or more electrical characteristics, such as the voltage, current, phase, frequency, etc. of the electrical power provided to the electrical coils 120.

The control system 150 can also include any suitable number of computing devices or controllers 160. Although only one controller 160 is shown in FIG. 1, the control system 150 can include a system of controllers or computing devices. Each of the controllers 160 of the control system 150 can include one or more processor(s) and one or more memory device(s). The one or more processor(s) can include any suitable processing device, such as a microprocessor, microcontroller, integrated circuit, logic device, and/or other suitable processing device. The one or more memory device(s) can include one or more computer-readable media, including, but not limited to, non-transitory computer-readable media, RAM, ROM, hard drives, flash drives, and/or other memory devices. The one or more memory device(s) can store information accessible by the one or more processor(s), including computer-readable instructions that can be executed by the one or more processor(s). The instructions can be any set of instructions that when executed by the one or more processor(s), cause the one or more processor(s) to perform operations, such as any of the operations and functions for which the controller 160 is configured, such as activating and controlling various aspects of the induction heating system 100. The instructions can be software written in any suitable programming language or can be implemented in hardware. Additionally, and/or alternatively, the instructions can be executed in logically and/or virtually separate threads on processor(s).

The memory device(s) can store data that can be accessed by the one or more processor(s). For example, the data can include temperature and pressure settings for thermally processing components disposed within the working chamber 110 of the induction heating system 100, heating rates, cooling rates, etc. The data can also include other data sets, parameters, outputs, information, etc. shown and/or described herein. The controller 160 can also include a communication interface for communicating, for example, with the other components of the induction heating system 100. The communication interface can include any suitable components for interfacing with one or more network(s) or electronic components, including for example, transmitters, receivers, ports, controllers, antennas, and/or other suitable components. Communication interface can be used to communicate with other electronic devices over one or more networks, such as a local area network (LAN), a wide area network (WAN), VHF network, a HF network, a Wi-Fi network, a WiMAX network, a gatelink network, and/or any other suitable communications networks. The communication interface can communicate over one or more networks using a wide variety of communication protocols. The communication interface can include a data bus or a combination of wired and/or wireless communication links that communicatively couple the controller 160 with other electronic devices.

Particularly, as depicted in FIG. 1, the one or more controllers 160 are communicatively coupled with various control devices of the control system 150. For instance, the one or more controllers 160 are communicatively coupled with the sensors 152, 154, the power supply 122, the first pump 132, and the second pump 144, among other possible devices. The controllers 160 can be communicatively coupled with these various devices by one or more wired and/or wireless communication links.

As noted above, one or more components 200 can be placed within the working chamber 110, e.g., for undergoing melt infiltration. One or more melt infiltrants 210 can likewise be placed within the working chamber 110. For instance, as shown in FIG. 1, a melt infiltrant 210 or block of metal can be placed beneath each of the components 200. The one or more components 200 can be ceramic fiber-containing preforms, for example. The melt infiltrants 210 can be a block or puck of metal (e.g., silicon), for example. The one or more components 200 can be any suitable type of components, such as a shroud segment of an aviation gas turbine engine as depicted in FIG. 1. However, the one or more components 200 can be other suitable types of components. For instance, the one or more components 200 can be other components positioned along a hot gas path of a gas turbine engine, such as components positioned within a combustion section, a high pressure turbine, and/or a low pressure turbine of a gas turbine engine. Further, the components can be other components other than those utilized in aviation gas turbine engines.

In some embodiments, during a melt infiltration process or cycle, the one or more controllers 160 can cause the heating source 118 to heat the susceptor 112 such that the one or more components 200 disposed within the working chamber 110 are heated at a first heating rate. Particularly, for the depicted embodiment of FIG. 1, the one or more controllers 160 can cause the power supply 122 to provide high frequency AC to the electrical coils 120. The high frequency AC can generate eddy currents in the susceptor 112, causing the susceptor 112 to increase in temperature. In turn, the susceptor 112 heats the contents within the working chamber 110, including the components 200 and melt infiltrants 210. The induction heating system 100 can rapidly inductively heat the components 200 and melt infiltrants 210 at the first heating rate, e.g., until the temperature within the working chamber 110 has reached a first temperature threshold, or alternatively, the induction heating system 100 can rapidly inductively heat the components 200 and melt infiltrants 210 for a first predetermined heating time. In some embodiments, the first heating rate corresponds to a heating rate of 50-500° C./minute. In yet other embodiments, the first heating rate corresponds to a heating rate of 100-200° C./minute.

After the induction heating system 100 rapidly inductively heats the components 200 and melt infiltrants 210 at the first heating rate and the temperature within the working chamber 110 reaches the first temperature threshold, the one or more controllers 160 cause the heating rate at which the components 200 and infiltrants 210 are heated to decrease. Particularly, the one or more controllers 160 cause the heating source 118 to heat the susceptor 112 such that the one or more components 200 disposed within the working chamber 110 are heated at a second heating rate, wherein the first heating rate is faster than the second heating rate. In some embodiments, the first heating rate is at least ten (10) times faster than the second heating rate. In yet other embodiments, the first heating rate is at least fifteen (15) times faster than the second heating rate. Further, in some embodiments, the second heating rate is faster than about 20° C./hour (0.33° C./min). Particularly, in some embodiments, the second heating rate R2 is between 20° C./hour and 200° C./hour (0.33° C./min and 3.33° C./min). The induction heating system 100 can heat the components 200 and melt infiltrants 210 at the second heating rate until the temperature within the working chamber 110 reaches a second temperature threshold. The second temperature threshold can be set at about the melting point of the melt infiltrants 210, for example.

Once the induction heating system 100 inductively heats the components 200 and melt infiltrants 210 at the second heating rate and the temperature within the working chamber 110 reaches the second temperature threshold, the one or more controllers 160 cause the heating rate at which the components 200 and infiltrants 210 are heated to decrease once again. Particularly, the one or more controllers 160 cause the heating source 118 to heat the susceptor 112 such that the one or more components 200 disposed within the working chamber 110 are heated at a third heating rate. In some embodiments, the third heating rate is slower than the first heating rate and the second heating rate. For instance, in some embodiments, the third heating rate is a rate of zero (0). Stated another way, in some embodiments, once the temperature within the working chamber 110 reaches the second temperature threshold, the one or more controllers 160 can cause the induction heating system 100 to maintain the temperature within the working chamber 110 constant. For instance, the temperature can be held at a substantially constant temperature. That is, in some embodiments, the temperature within the working chamber 110 can be held constant at or above the melting point of the melt infiltrants 210 for a predetermined time period, e.g., until the melt infiltrants 210 have infiltrated the components 200 in a satisfactory manner. Thereafter, the infiltrated component can be cooled and finish machined as necessary to form the final component, e.g., a final CMC component. The melt infiltration process will be described in greater detail below with reference to method (300).

When a ceramic fiber-containing preform component is infiltrated with a melt infiltrant, a densified composite component can be formed, such as a CMC component. Example matrix materials utilized for such CMC materials can include: silicon carbide, silicon, silica, or alumina matrix materials and combinations thereof. Ceramic fibers can be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). CMC materials may have coefficients of thermal expansion in the range of about $1.3 \times 10^{-6}$ in/in/° F. to about $3.5 \times 10^{-6}$ in/in/° F. in a temperature range of approximately 1000-1200° F.

An example fabrication process for such CMC components can include laying up one or more layers formed of "prepregs" or tape-like structures that include a reinforcement material (e.g., carbon fibers) impregnated with a slurry that contains a precursor of matrix material and one or more organic binders. The prepreg tapes undergo processing (including firing) to convert the precursor to the desired ceramic. Multiple plies of the resulting prepregs are then stacked and debulked to form a fiber-containing preform. Thereafter, the preform can undergo thermal processing. Particularly, the preform component can undergo a compaction process, a burnout process, and a consolidation or densification process, such as a melt infiltration process, to cure the preform. The melt infiltration process can be performed by the induction heating system 100 as will be explained in greater detail herein. Particularly, after the layup process, the preform can be compacted and subjected to elevated temperatures and pressures, e.g., in an autoclave. Various volatiles can be removed during compaction. Subsequently, the preform can undergo a burnout process to pyrolyze the binders to produce porosity to allow a subsequent infiltrant to penetrate the preform. More particularly, heating (i.e., firing) the preform under vacuum or inert atmosphere decomposes the binders, removes the solvents, and converts the precursor to the desired pyrolyzed material. The decomposition of the binders during the burnout process results in a porous preform. Next, the preform may undergo a melt-infiltration process in which silicon or another suitable material is heated to melt infiltrate the component. In one example, where the preform is fired with silicon, the component can undergo silicon melt-infiltration. Thereafter, the densified preform can be finish machined as necessary to form the final CMC component. For instance, the component can be ground or otherwise machined, e.g., to bring the component within tolerance and to shape the component to the desired shape.

Figure 3:
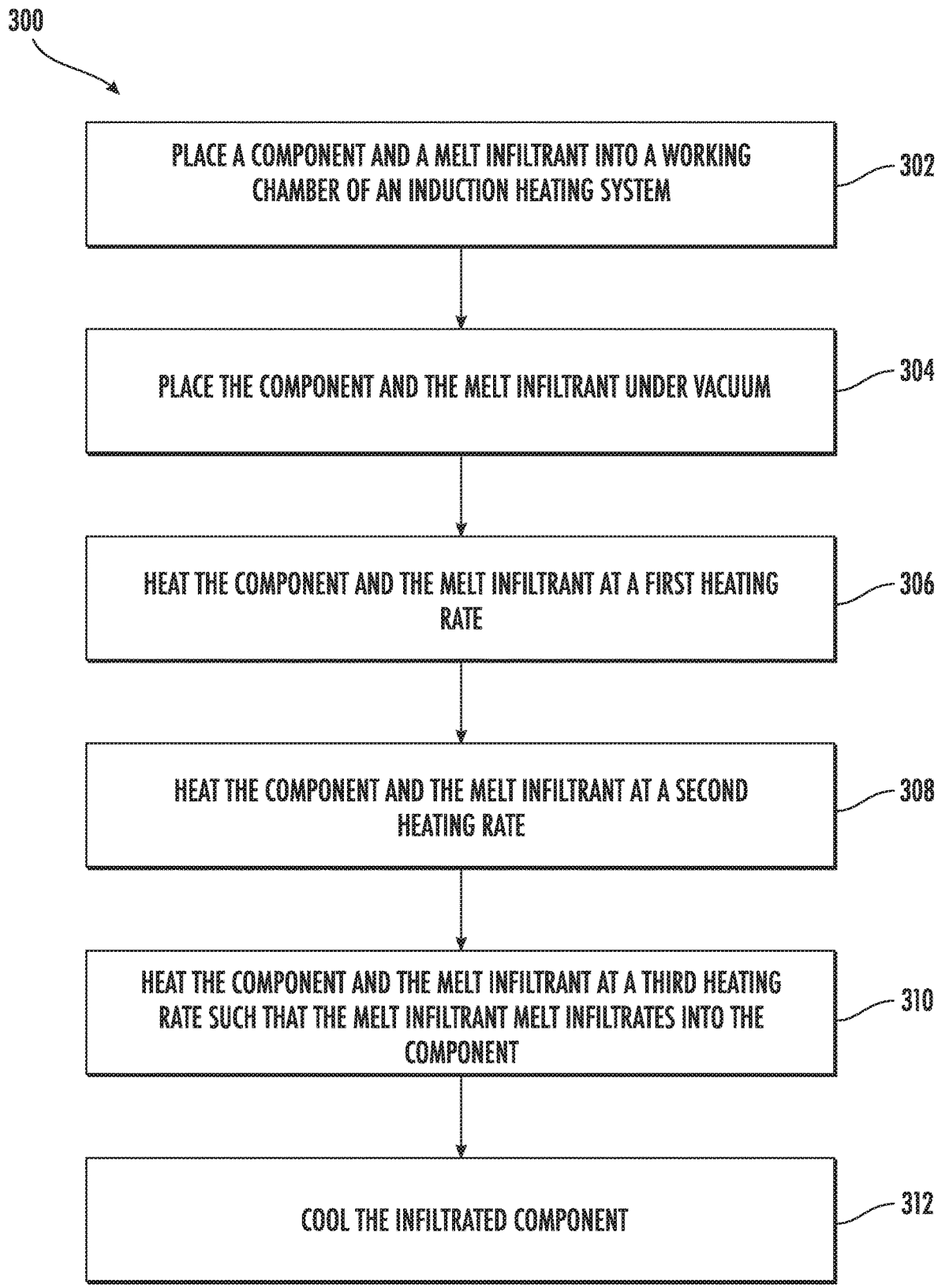
FIG. 3 provides a flow diagram for an example method of melt infiltrating a component utilizing an induction heating system according to an example embodiment of the present disclosure.

FIG. 3 provides a flow diagram for an example method (300) of melt infiltrating a component (or multiple components) utilizing an induction heating system according to an example embodiment of the present disclosure. For instance, one or more ceramic preforms can be melt infiltrated with the induction heating system 100 of FIG. 1 in accordance with method (300). Some or all of the method (300) can be implemented by the control system 150 described herein. In addition, it will be appreciated that exemplary method (300) can be modified, adapted, expanded, rearranged and/or omitted in various ways without deviating from the scope of the present subject matter.

At (302), the method (300) includes placing a component and a melt infiltrant into a working chamber of an induction heating system. For instance, the component can be a ceramic fiber-containing preform, such as a ceramic fiber-containing preform formed of one or more of the materials described above. The matrix material can include a carbon black resin precursor. The ceramic fiber-containing preform can undergo a compaction/debulking process and then a burn out process prior to being placed in the working chamber of the induction heating system. Accordingly, the preform placed within the working chamber can be a porous preform component. In some embodiments, the volume of the preform component is or is about one third porous. In some embodiments, the volume of the preform component is less than one third porous. Further, in some embodiments the pore size of the pores of the preform component range between 0.1 and 0.2 microns. In some embodiments, at least 95% or more of the pores have a pore size less than 0.2 microns. In other embodiments, at least 85% or more of the pores have a pore size less than 0.2 microns. In such embodiments, the remaining porous volume of the preform component can be made of cracks and other imperfections. Such cracks and imperfections can be on the order of 0.2 to 50 microns. The melt infiltrant can be a suitable metal. For example, the melt infiltrant can be a block or puck of silicon. The melt infiltrant can be positioned proximate the component. More particularly, the melt infiltrant can be positioned beneath the component. As shown in FIG. 1, for example, melt infiltrants 210 are shown disposed beneath their respective ceramic fiber-containing preforms 200 within the working chamber 110 of the induction heating system 100, and more particularly, the components are received within the working chamber 110 defined by the susceptor 112 of the induction heating system 100.

At (304), the method (300) includes placing, via the induction heating system, the component and the melt infiltrant under vacuum. For instance, with reference to FIG. 1, the induction heating system 100 can create a vacuum within the working chamber 110 of the susceptor 112. That is, the induction heating system 100 can create a negative pressure or vacuum within the working chamber 110 by moving air from the working chamber 110 of the susceptor 112 through port 136 and conduit 134. The negative pressure or vacuum created within the working chamber 110 of the susceptor 112 is denoted by "-P" in FIG. 1. To create a vacuum within the working chamber 110 of the susceptor 112, air is drawn or moved out of the working chamber 110 of the susceptor 112 by first pump 132 and exhausted to an external volume, such as an ambient environment.

At (306), the method (300) includes heating, via the induction heating system, the component and the melt infiltrant disposed within the working chamber of the induction heating system at a first heating rate. For instance, in some embodiments with reference to FIG. 1, to inductively heat the components 200 and the melt infiltrants 210 disposed within the working chamber 110, the one or more controllers 160 cause the heating source 118 to inductively heat the susceptor 112, which in turn heats the components 200 and the melt infiltrants 210 disposed within the working chamber 110. More specifically, for the depicted embodiment of FIG. 1, the one or more controllers 160 cause the power supply 122 to pass high frequency AC through the electrical coils 120. The high frequency AC passed through the electrical coils 120 generates eddy currents in the susceptor 112, causing the susceptor 112 to heat or increase in temperature. The insulating layer 114 can facilitate generation of the eddy currents in the susceptor 112. The heated susceptor 112 in turn imparts thermal energy or heat to the one or more components 200 and melt infiltrants 210 positioned within the working chamber 110.

Figure 4:
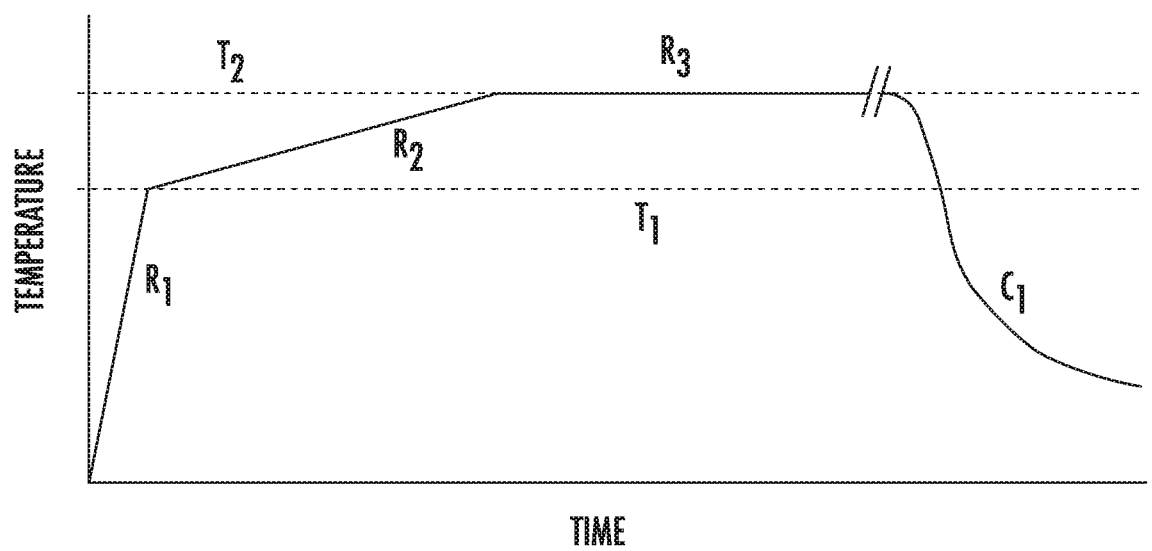
FIG. 4 provides a graph depicting temperature as a function of time within a working chamber of the induction heating system of FIG. 1 during a melt infiltration process.

As noted above, the component and the melt infiltrant can be inductively heated at a first heating rate. For instance, FIG. 4 provides a graph depicting temperature as a function of time within the working chamber 110 of the induction heating system 100 of FIG. 1 during a melt infiltration process. As shown in FIG. 4, the working chamber 110 and the component 200 and melt infiltrant 210 disposed therein are heated at a first heating rate R1. In some implementations, the induction heating system 100 rapidly heats the working chamber 110 and contents therein. For instance, in some implementations, the first heating rate R1 is faster than 50° C./minute. Particularly, in some implementations, the first heating rate R1 is between 50° C./minute and 1000° C./minute. In some implementations, the first heating rate R1 corresponds to a heating rate between 50° C./minute and 500° C./minute. In yet other implementations, the first heating rate R1 corresponds to a heating rate between 100° C./minute and 200° C./minute.

In some implementations, in heating the component 200 and the melt infiltrant 210 at the first heating rate R1 at (306), the component 200 and the melt infiltrant 210 are heated at the first heating rate R1 within the working chamber 110 of the induction heating system 100 until a temperature within the working chamber 110 reaches a first temperature threshold T1 as shown in FIG. 4. With reference to FIG. 1, one or more of the sensors 152, 154 can monitor one or more operating parameters indicative of the temperature within the working chamber 110. For instance, the temperature sensor 152 can monitor the temperature within the working chamber 110 and can provide one or more signals indicative of the temperature. The one or more controllers 160 can receive such signals and can determine whether the temperature within the working chamber 110 has reached the first temperature threshold T1, e.g., by comparing the sensed temperature to the first temperature threshold T1. In other embodiments, the pressure sensor 154 or some other sensor can provide one or more signals indicative of the temperature. The one or more controllers 160 can receive such signals and can determine the temperature within the working chamber 110 based at least in part on such signals. Then, the sensed temperature can be compared to the first temperature threshold T1 to determine whether the temperature within the working chamber 110 has reached the first temperature threshold T1.

In some implementations, the first temperature threshold T1 can be set at a temperature that corresponds to a temperature that is about ten percent (10%) less than the temperature of the melting point of the melt infiltrant 210. For instance, if the melting point of the melt infiltrant 210 is 1000° C., then the first temperature threshold T1 is set at 900° C. as it is ten percent (10%) less than 1000° C. In yet other implementations, the first temperature threshold T1 can be set at a temperature that corresponds to a temperature that is about five percent (5%) less than the temperature of the melting point of the melt infiltrant 210. For instance, if the melting point of the melt infiltrant 210 is 1410° C. (e.g., about the melting point of silicon), then the first temperature threshold T1 is set at 1340° C. as it is five percent (5%) less than 1410° C. In further implementations, the first temperature threshold T1 can be set at a temperature that corresponds to a temperature that is within ten percent (10%) of the temperature of the melting point of the melt infiltrant 210, e.g., as measured by comparing temperature values in Celsius. For example, the first temperature threshold T1 can be set at a temperature that is 1-10%, or 3-10%, or 5-10% of the temperature of the melting point of the melt infiltrant 210. In some embodiments, the first temperature threshold T1 can be set at a temperature that is less than and within 1-10%, or 3-10%, or 5-10% of the temperature of the melting point of the melt infiltrant 210.

At (308), the method (300) includes heating, via the induction heating system, the component and the melt infiltrant disposed within the working chamber at a second heating rate, wherein the first heating rate is faster than the second heating rate. For instance, as shown in FIG. 4, after the temperature within the working chamber 110 reaches the first temperature threshold T1, the heating rate is decreased or slowed to the second heating rate R2, and accordingly, the components and the melt infiltrants disposed within the working chamber are heated at the second heating rate R2 for a time. As graphically shown in FIG. 4, the second heating rate R2 is a slower heating rate than the first heating rate R1. In some implementations, the second heating rate R2 is faster than about 20° C./hour (0.33° C./min). Particularly, in some implementations, the second heating rate R2 is between 20° C./hour and 200° C./hour (0.33° C./min and 3.33° C./min). In some implementations, the first heating rate R1 is at least ten (10) times faster than the second heating rate R2. In some implementations, the first heating rate R1 is at least fifteen (15) times faster than the second heating rate R2. The heating rate within the working chamber 110 is slowed from the first heating rate R1 to the second heating rate R2 to allow the components 200 and melt infiltrants 210 disposed within the working chamber 110 to reach thermal uniformity, e.g., prior to the melt infiltrants 210 reaching their melting point. This can, for example, provide for more uniform densification (e.g., more uniform infiltration) of the components 200 without extraneous porosity or uninfiltrated regions.

In some implementations, with reference to FIG. 1, to inductively heat the components 200 and the melt infiltrants 210 disposed within the working chamber 110 at the second heating rate R2, the one or more controllers 160 cause the heating source 118 to inductively heat the susceptor 112 at the second heating rate, which in turn heats the components 200 and the melt infiltrants 210 disposed within the working chamber 110 at the second heating rate. More specifically, for the depicted embodiment of FIG. 1, the one or more controllers 160 cause the power supply 122 to pass less high frequency AC through the electrical coils 120 to decrease the heating rate from the first heating rate R1 to the second heating rate R2, e.g., when the temperature reaches the first temperature threshold T1. The high frequency AC passed through the electrical coils 120 continues to generate eddy currents in the susceptor 112, albeit less, causing the susceptor 112 to decrease in temperature yet still heat the working chamber 110 and components 200 and melt infiltrants 210 therein.

In some implementations, in heating the component 200 and the melt infiltrant 210 at the second heating rate R2 at (308), the component 200 and the melt infiltrant 210 are heated at the second heating rate R2 within the working chamber 110 of the induction heating system 100 until a temperature within the working chamber 110 reaches a second temperature threshold T2 as shown in FIG. 4. With reference to FIG. 1, one or more of the sensors of the control system 150 can monitor one or more operating parameters indicative of the temperature within the working chamber 110. For instance, the temperature sensor 152 can monitor the temperature within the working chamber 110 and can provide one or more signals indicative of the temperature. The one or more controllers 160 can receive such signals and can determine whether the temperature within the working chamber 110 has reached the second temperature threshold T2, e.g., by comparing the sensed temperature to the second temperature threshold T2. In other embodiments, the pressure sensor 154 or some other sensor can provide one or more signals indicative of the temperature. The one or more controllers 160 can receive such signals and can determine the temperature within the working chamber 110 based at least in part on such signals. Then, the sensed temperature can be compared to the second temperature threshold T2 to determine whether the temperature within the working chamber 110 has reached the second temperature threshold T2. As shown in FIG. 4, the second temperature threshold T2 is greater than the first temperature threshold T1.

In some implementations, the second temperature threshold T2 can be set at a temperature that corresponds to a temperature that is about ten percent (10%) greater than the first temperature threshold T1. In yet other implementations, the second temperature threshold T2 can be set at a temperature that corresponds to a melting point of the melt infiltrant(s) 210 within the working chamber 110. For instance, if the melt infiltrants 210 are silicon, the second temperature threshold T2 can be set at about 1410° C.

At (310), the method (300) includes heating, via the induction heating system, the component and the melt infiltrant disposed within the working chamber at a third heating rate. For instance, as shown in FIG. 4, after the temperature within the working chamber 110 reaches the second temperature threshold T2, the heating rate is decreased or slowed to the third heating rate R3, and accordingly, the components and the melt infiltrants disposed within the working chamber are heated at the third heating rate R3 for a time. As graphically depicted in FIG. 4, the third heating rate R3 is a slower heating rate than the first heating rate R1 and the second heating rate R2. Particularly, for this implementation, the third heating rate R3 is a constant heating rate maintained at or above a melting point of the melt infiltrants 210 such that the melt infiltrants 210 infiltrate their respective components 200. The one or more controllers 160 can cause the power supply 122 to supply high frequency AC such that the temperature within the working chamber 110 is maintained within a predetermined margin of a set point temperature (e.g., a temperature at or above the melting point of the melt infiltrants).

Specifically, as shown in FIG. 1, the blocks of melt infiltrant 210 are melted at high temperature (e.g., a temperature above the melting point of the melt infiltrant 210) such that the melt infiltrants 210 infiltrate their respective preform components 200 in liquid form as represented by MI. Capillary forces drive the liquid infiltrant into the pores, channels, openings, etc. of the preform components 200. In embodiments in which the melt infiltrants 210 are silicon and the components 200 are ceramic preforms, at least some of the liquid infiltrant reacts with carbon to form a ceramic matrix, e.g., silicon carbide. As such, in some implementations, in heating the preform components 200 at the third heating rate R3 during melt infiltration at (310), the method (300) includes reacting at least some of the liquid infiltrant with carbon to form a ceramic matrix (e.g., silicon carbide).

In some implementations, heating the component and the melt infiltrant disposed within the working chamber at the third heating rate at (310) includes heating, via the induction heating system, the component and the melt infiltrant disposed within the working chamber at the third heating rate for a preselected time period to allow the melt infiltrant to infiltrate the component, e.g., as described above. The preselected time period can be based at least in part on microstructural analysis of densified or infiltrated components to determine the length of time in which such components are infiltrated in a satisfactory manner.

Notably, the component can be heated at the heating rates disclosed herein without the occurrence of self-propagating exothermal chemical reactions. The selection of carbon content of the preform component, the matrix pore size of the preform prior to infiltration, and the material of the infiltrant can prevent or greatly minimize self-propagating exothermal chemical reactions from occurring. In some embodiments, for example, the resin precursor of the matrix material can be selected as carbon black and the matrix material can include a silicon carbide powder. Further, at least 95% or more of the pores of the preform component can have a pore size of less than 0.2 microns. In other embodiments, at least 85% or more of the pores have a pore size of less than 0.2 microns. In yet other embodiments, at least 85% or more of the pores have a pore size between 0.1 and 0.2 microns. About one third or less of the preform can be porous. The melt infiltrant can be selected as silicon. In such example embodiments, the rate of infiltration of the infiltrant can be controlled to or about to 0.05-0.2 inches/minute (0.13-0.51 cm/minute), which allows the infiltrant to react with the materials of the preform component without the occurrence of self-propagating exothermal chemical reactions. This may lead to better dimensional control and structural integrity of the final CMC component.

At (312), the method (300) includes cooling the infiltrated component via the induction heating system. That is, after the ceramic preform components 200 have been infiltrated, the induction heating system 100 can cool the now-infiltrated components 200. During cooling, the liquid infiltrant continues reacting with carbon to form a densified ceramic matrix, e.g., a densified silicon carbide matrix. Due to the relatively small volume of the working chamber 110, the relatively few parts disposed therein (e.g., compared to batch processes), and the cooling features described herein, the induction heating system 100 can rapidly cool the infiltrated component, e.g., as denoted by the C1 shown in FIG. 4. In some implementations, the infiltrated component can be cooled under vacuum, however in some implementations, the infiltrated component can be cooled not under vacuum, e.g., at an ambient pressure.

In some implementations, for example, cooling the infiltrated component at (312) via the induction heating system includes flowing an inert atmosphere into the working chamber. The inert atmosphere can include at least one of argon, nitrogen, and helium, for example. Moreover, in such embodiments, the induction heating system 100 can cease subjecting the infiltrated component to vacuum conditions. For instance, as shown in FIG. 1, the first pump 132 can seize moving air from the working chamber 110 to an external volume, thereby removing the vacuum conditions within the working chamber 110. Once the atmosphere within the working chamber 110 equilibrates, the one or more controllers 160 can cause the first pump 132 to move an inert atmosphere into the working chamber 110. In this way, the induction heating system 100 can flow an inert atmosphere (e.g., argon, nitrogen, helium, some combination thereof, etc.) into the working chamber 110 to facilitate rapid cooling of the infiltrated components 200 and various components of the induction heating system 100, such as the susceptor 112, the insulating layer 114, and the electrical insulator 116. In addition, the one or more controllers 160 can cause the one or more pumps to flow a cooling fluid through the one or more coil housings 124 to rapidly cool the electrical coils 120, e.g., as shown in FIG. 1. This further accelerates the cooling of the infiltrated components 200.

Additionally or alternatively, in some implementations, cooling the infiltrated component at (312) via the induction heating system includes flowing a cooling fluid through a heat exchanger positioned in a heat exchange relationship with the working chamber. For instance, as shown in FIG. 1, the one or more controllers 160 can cause the second pump 144 to move a working fluid through the cooling loop 142. The working fluid moved through the cooling loop 142 can flow downstream to the first heat exchanger 146. As depicted, the first heat exchanger 146 is positioned in a heat exchange relationship with the working chamber 110.

Accordingly, when the working fluid is moved through the first heat exchanger 146, the relatively cool working fluid removes or accepts heat from the relatively hot air within the working chamber 110, thereby cooling the working chamber 110. The working fluid can include at least one of argon, nitrogen, helium, water, air, some combination thereof, etc. The working fluid heated at the first heat exchanger 146 can flow downstream along the cooling loop 142 to a second heat exchanger 148 where heat can be removed from the working fluid. In some exemplary embodiments, the first heat exchanger 146 can be disposed around the susceptor 112 and extend substantially from the top to the bottom of the susceptor 112 along the vertical direction V.

Further, in some implementations, the method (300) can include finish machining the infiltrated component as needed to form the final component, e.g., a final CMC component. For instance, the infiltrated component can be grinded or otherwise machined, e.g., to bring the component within tolerance and to shape the component to the desired shape.

Figure 5:
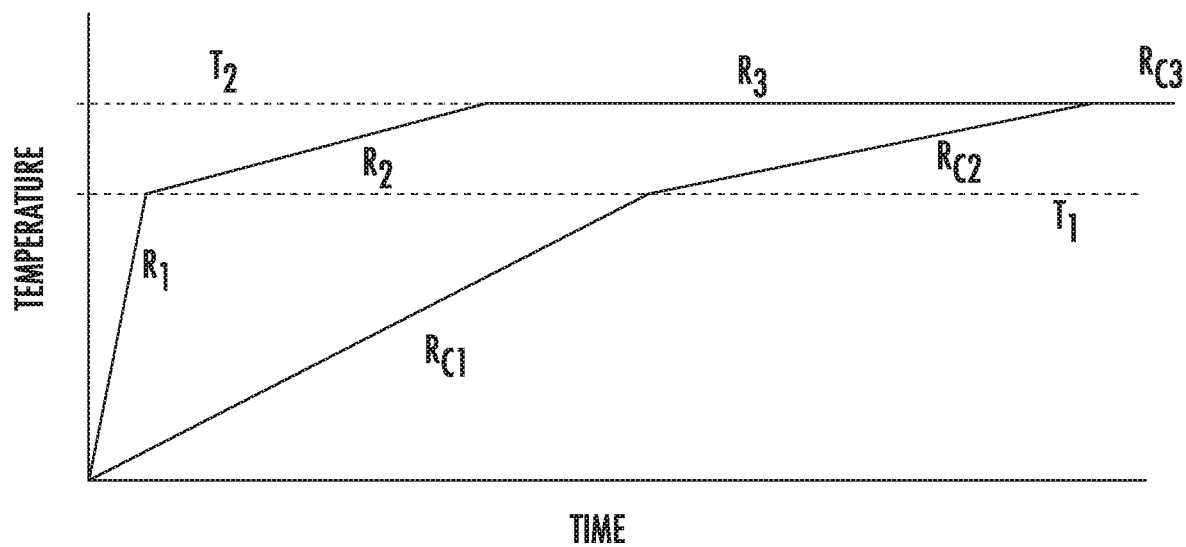
FIG. 5 provides a graph depicting the advantages of inductively heating components during a melt infiltration process using the method and system of the present disclosure compared to heating components during a melt infiltration process using conventional methods and systems.

The method (300) and induction heating system 100 described herein provide a number of advantages and benefits. For instance, the induction heating system 100 can rapidly inductively heat components and can provide cooling in such a manner that cycle times for melt infiltrating such components can be significantly reduced over conventional melt infiltration processes. FIG. 5 provides a graph depicting the advantages of inductively heating components during a melt infiltration process using the method (300) and system 100 of the present disclosure compared to heating components during a melt infiltration process using conventional methods and systems. As shown in FIG. 5, utilizing the method (300) and system 100 of the present disclosure, during a melt infiltration process, one or more components are heated at a first heating rate R1, at a second heating rate R2 upon the temperature reaching a first temperature threshold T1, and then a third heating rate R3 upon the temperature reaching a second temperature threshold T2, e.g., in a similar manner as described herein. The first heating rate R1 can be a rate corresponding to a heating rate of 50-500° C./minute, for example. The second heating rate R2 can be a rate corresponding to a heating rate of 20-200° C./hour, for example. The third heating rate R3 can be a rate corresponding to a rate of zero (0) in which the temperature is held substantially constant, e.g., as shown in FIG. 5.

As further shown in FIG. 5, utilizing a conventional method and heating system, during a melt infiltration process, one or more components are heated at a first conventional heating rate $R_{C1}$, at a second conventional heating rate $R_{C2}$ upon the temperature reaching a first temperature threshold T1, and then a third conventional heating rate $R_{C3}$ upon the temperature reaching a second temperature threshold T2. The first conventional heating rate $R_{C1}$ can be a rate corresponding to a heating rate of 8° C./minute. The second conventional heating rate $R_{C2}$ can be a rate corresponding to a heating rate of 15° C./hour, which is faster than the first conventional heating rate $R_{C1}$. The third conventional heating rate $R_{C3}$ can be a rate corresponding to a rate of zero (0), e.g., as shown in FIG. 5.

As graphically depicted in FIG. 5, in utilizing the method (300) and system 100 of the present disclosure, components can be heated significantly more rapidly than using conventional methods and systems. For instance, in the initial or first heating phase, the first heating rate R1 can correspond to a heating rate of 50-500° C./minute whilst the first conventional heating rate $R_{C1}$ corresponds to a heating rate of 8° C./minute. Further, in the second heating phase, the second heating rate R2 can correspond to a heating rate of 20-200° C./hour, which is slower than the first heating rate R1, whilst the second conventional heating rate $R_{C2}$ corresponds to a heating rate of 15° C./hour, which is faster than the first conventional heating rate $R_{C1}$. Furthermore, notably, in utilizing the method (300) and system 100 of the present disclosure, the constant heating or third heating phase is commenced much faster than when using a conventional method and system, as depicted by the method (300) and system 100 of the present disclosure reaching R3 much faster than the conventional system reaches $R_{C3}$.

Furthermore, notably, unexpected results were achieved in utilizing the method (300) and system 100 of the present disclosure to melt infiltrate components. Particularly, the ability to heat components at much faster rates than previously accepted practices was unexpected. Inductively heating components at such rates whilst preventing or not inducing self-propagating exothermal reactions also was unexpected. Accordingly, in utilizing the method (300) and system 100 provided herein, components can be inductively heated at faster rates during melt infiltration whilst not sacrificing the mechanical properties or integrity of the final component.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

Further aspects of the invention are provided by the subject matter of the following clauses:

1. A method of melt infiltrating a component utilizing an induction heating system, the method comprising: heating, via the induction heating system, the component and a melt infiltrant at a first heating rate within a working chamber of the induction heating system, wherein the first heating rate is faster than 50° C./minute; and heating, via the induction heating system, the component and the melt infiltrant at a second heating rate within the working chamber, wherein the first heating rate is faster than the second heating rate.

2. The method of any preceding clause, wherein the component is heated at the first heating rate until a temperature within the working chamber reaches a first temperature threshold.

3. The method of any preceding clause, wherein the first temperature threshold is set at a temperature that is set less than and within 1-10% of a melting point of the melt infiltrant.

4. The method of any preceding clause, wherein the first heating rate corresponds to a heating rate slower than 500° C./minute.

5. The method of any preceding clause, wherein the first heating rate corresponds to a heating rate between 100° C./minute and 200° C./minute.

6. The method of any preceding clause, wherein the component is heated at the second heating rate until a temperature within the working chamber reaches a second temperature threshold.

7. The method of any preceding clause, wherein the second temperature threshold is a melting point of the melt infiltrant.

8. The method of any preceding clause, wherein the first heating rate is at least ten times faster than the second heating rate.

9. The method of any preceding clause, wherein the second heating rate corresponds to a heating rate between 20° C./hour and 200° C./hour.

10. The method of any preceding clause, further comprising: heating, via the induction heating system, the component and the melt infiltrant within the working chamber at a substantially constant temperature at or above a melting point of the melt infiltrant for a time period such that the melt infiltrant infiltrates the component.

11. The method of any preceding clause, further comprising: heating, via the induction heating system, the component and the melt infiltrant within the working chamber at or above a melting point of the melt infiltrant for a preselected time period to allow the melt infiltrant to infiltrate the component; and cooling, via the induction heating system, the infiltrated component.

12. The method of any preceding clause, wherein the cooling comprises: flowing an inert atmosphere into the working chamber.

13. The method of any preceding clause, wherein the cooling comprises: flowing a cooling fluid through a heat exchanger positioned in a heat exchange relationship with the working chamber.

14a. The method of any preceding clause, wherein in heating, via the induction heating system, the component and the melt infiltrant at the first heating rate and at the second heating rate, there are no self-propagating exothermal reactions between the component and the melt infiltrant.

14b. The method of any preceding clause, wherein the melt infiltrant is silicon and the component is a CMC preform, and wherein the method further comprises: heating, via the induction heating system, the component and the melt infiltrant within the working chamber at or above a melting point of the melt infiltrant to allow the melt infiltrant to infiltrate the component, and wherein the melt infiltrant infiltrates the component at an infiltration rate between 0.13-0.51 cm/minute.

15. An induction heating system, comprising: a susceptor defining a working chamber for receiving a component and a melt infiltrant; a heating source for inductively imparting thermal energy to the susceptor; a control system, comprising: one or more sensors; one or more controllers communicatively coupled with the one or more sensors and the heating source, the one or more controllers configured to: cause the heating source to heat the susceptor such that the component and the melt infiltrant disposed within the working chamber are heated at a first heating rate, wherein the first heating rate is faster than 50° C./minute; and cause the heating source to heat the susceptor such that the component and the melt infiltrant disposed within the working chamber are heated at a second heating rate, wherein the first heating rate is faster than the second heating rate.

16. The induction heating system of any preceding clause, wherein the working chamber is between one tenth of a cubic foot and ten cubic feet.

17. The induction heating system of any preceding clause, wherein the first heating rate is between 100° C./minute and 500° C./minute and the second heating rate is between 20° C./hour and 200° C./hour.

18. A method of melt infiltrating a component utilizing an induction heating system, the method comprising: heating, via the induction heating system, the component and a melt infiltrant at a first heating rate within a working chamber of the induction heating system until a temperature within the working chamber reaches a first temperature threshold, wherein the first heating rate is faster than 50° C./minute; heating, via the induction heating system, the component and the melt infiltrant at a second heating rate within the working chamber until the temperature within the working chamber reaches a second temperature threshold, wherein the first heating rate is at least five times faster than the second heating rate and the second temperature threshold is greater than the first temperature threshold.

19. The method of any preceding clause, wherein the component is a CMC preform having pores, and wherein at least 85% or more of the pores have a pore size of less than 0.2 microns.

20. The method of any preceding clause, wherein the first temperature threshold is set at a temperature that is less than and within 5-10% of the temperature of a melting point of the melt infiltrant.

21. The method of any preceding clause, wherein the second heating rate corresponds to a heating rate between 20° C./hour and 200° C./hour.

What is claimed is:

1. A method of melt infiltrating a component utilizing an induction heating system, the method comprising:
   heating, via the induction heating system, the component and a melt infiltrant at a first heating rate within a working chamber of the induction heating system, wherein the first heating rate is faster than 50° C./minute;
   heating, via the induction heating system, the component and the melt infiltrant at a second heating rate within the working chamber, wherein the first heating rate is faster than the second heating rate; and
   heating, via the induction heating system, the component and the melt infiltrant within the working chamber at a substantially constant temperature at or above a melting point of the melt infiltrant for a time period such that the melt infiltrant infiltrates the component.

2. The method of claim 1, the component is heated at the first heating rate until a temperature within the working chamber reaches a first temperature threshold.

3. The method of claim 2, wherein the first temperature threshold is set at a temperature that is set less than and within 1-10% of a melting point of the melt infiltrant.

4. The method of claim 1, wherein the first heating rate corresponds to a heating rate slower than 500° C./minute.

5. The method of claim 1, wherein the first heating rate corresponds to a heating rate between 100° C./minute and 200° C./minute.

6. The method of claim 1, wherein the component is heated at the second heating rate until a temperature within the working chamber reaches a second temperature threshold.

7. The method of claim 6, wherein the second temperature threshold is a melting point of the melt infiltrant.

8. The method of claim 1, wherein the first heating rate is at least ten times faster than the second heating rate.

9. The method of claim 1, wherein the second heating rate corresponds to a heating rate between 20° C./hour and 200° C./hour.

10. The method of claim 1, wherein the component and the melt infiltrant are heated within the working chamber at the substantially constant temperature at or above the melting point of the melt infiltrant for a preselected time period to allow the melt infiltrant to infiltrate the component, and wherein the method further comprises:
   cooling, via the induction heating system, the infiltrated component.

11. The method of claim 10, wherein the cooling comprises:
flowing an inert atmosphere into the working chamber.

12. The method of claim 10, wherein the cooling comprises:
flowing a cooling fluid through a heat exchanger positioned in a heat exchange relationship with the working chamber.

13. The method of claim 1, wherein the melt infiltrant is silicon and the component is a CMC preform, and wherein during the heating, via the induction heating system, the component and the melt infiltrant within the working chamber at the substantially constant temperature at or above the melting point of the melt infiltrant to allow the melt infiltrant to infiltrate the component, the melt infiltrant infiltrates the component at an infiltration rate between 0.13-0.51 cm/minute.

14. The method of claim 1, wherein in heating, via the induction heating system, the component and the melt infiltrant at the first heating rate and at the second heating rate, there are no self-propagating exothermal reactions between the component and the melt infiltrant.

15. A method of melt infiltrating a component, the method comprising:
inductively heating, via a heating source of an induction heating system, a susceptor that defines a working chamber for receiving the component and a melt infiltrant such that the component and the melt infiltrant disposed within the working chamber are heated at a first heating rate, wherein the first heating rate is faster than 50° C./minute and slower than 1000° C./minute, and wherein the melt infiltrant is silicon and the component is a CMC preform; and
inductively heating, via the heating source, the susceptor such that the component and the melt infiltrant disposed within the working chamber are heated at a second heating rate, wherein the first heating rate is faster than the second heating rate; and
heating, via the induction heating system, the component and the melt infiltrant within the working chamber at or above a melting point of the melt infiltrant to allow the melt infiltrant to infiltrate the component at an infiltration rate between 0.13-0.51 cm/minute.

16. The method of claim 15, wherein the working chamber is between one tenth of a cubic foot and ten cubic feet.

17. The method of claim 15, wherein the first heating rate is between 100° C./minute and 500° C./minute and the second heating rate is between 20° C./hour and 200° C./hour.

18. A method of melt infiltrating a component utilizing an induction heating system, the method comprising:
heating, via the induction heating system, the component and a melt infiltrant at a first heating rate within a working chamber of the induction heating system until a temperature within the working chamber reaches a first temperature threshold, wherein the first heating rate is faster than 50° C./minute;
heating, via the induction heating system, the component and the melt infiltrant at a second heating rate within the working chamber until the temperature within the working chamber reaches a second temperature threshold, wherein the first heating rate is at least ten times faster than the second heating rate and the second temperature threshold is greater than the first temperature threshold;
heating, via the induction heating system, the component and the melt infiltrant within the working chamber at a substantially constant temperature at or above a melting point of the melt infiltrant for a preselected time period to allow the melt infiltrant to infiltrate the component; and
cooling, via the induction heating system, the infiltrated component.

19. The method of claim 18, wherein the component is a CMC preform having pores, and wherein at least 85% or more of the pores have a pore size of less than 0.2 microns.

20. The method of claim 18, wherein the first temperature threshold is set at a temperature that is less than and within 5-10% of the temperature of a melting point of the melt infiltrant.

* * * * *